United States Patent [19]

Mitschelen et al.

[11] Patent Number: 5,918,943
[45] Date of Patent: Jul. 6, 1999

[54] VEHICLE SEAT ASSEMBLEY WITH BACKREST FRAME SWIVELABLY COUPLED WITH A SEAT FRAME

[75] Inventors: Rolf Mitschelen, Kirchheim/Teck; Werner Hauser, Calw; Ralf-Henning Schrom, Rottenburg, all of Germany

[73] Assignee: Mercedes-Benz AG, Stuttgart, Germany

[21] Appl. No.: 08/789,580

[22] Filed: Jan. 28, 1997

[30] Foreign Application Priority Data

Feb. 5, 1996 [DE] Germany ............................. 196 03946

[51] Int. Cl.⁶ ...................................................... B60N 2/42
[52] U.S. Cl. ............................... 297/452.18; 297/440.2; 297/362.11; 297/463.1
[58] Field of Search ............................. 297/452.18, 483, 297/452.38, 440.2, 362.11, 463.1

[56] References Cited

U.S. PATENT DOCUMENTS

| | | | |
|---|---|---|---|
| 4,402,547 | 9/1983 | Weston et al. ................. | 297/362.11 X |
| 5,123,706 | 6/1992 | Granzow et al. .................. | 297/452.18 |
| 5,131,721 | 7/1992 | Okamoto ............................ | 297/452.18 |
| 5,246,271 | 9/1993 | Boisset ................................ | 297/483 X |
| 5,292,178 | 3/1994 | Loose et al. .................... | 297/362.11 X |
| 5,318,341 | 6/1994 | Griswold et al. .................. | 297/362.11 |
| 5,390,982 | 2/1995 | Johnson et al. ..................... | 297/483 X |
| 5,447,360 | 9/1995 | Hewko et al. ...................... | 297/452.18 |
| 5,536,069 | 7/1996 | Bray et al. ......................... | 297/362.11 |
| 5,586,782 | 12/1996 | Zimmerman, II et al. .......... | 280/730.2 |
| 5,611,604 | 3/1997 | Thomas et al. ..................... | 297/483 X |

FOREIGN PATENT DOCUMENTS

| | | |
|---|---|---|
| 3841532A1 | 6/1990 | Germany . |
| 4238549A1 | 5/1994 | Germany . |
| 4020057A1 | 1/1997 | Germany . |

*Primary Examiner*—Peter M. Cuomo
*Assistant Examiner*—Stephen Vu
*Attorney, Agent, or Firm*—Evenson, McKeown, Edwards & Lenahan P.L.L.C.

[57] ABSTRACT

A vehicle seat is provided having a seat frame and a backrest frame made of a light metal diecast material which are swivellably connected with one another by means of seat fittings. For providing a vehicle seat which, in the manner of a building block system, can be upgraded by means of standardized supplementary parts from a simple seat for the lower price class to an integral seat of the upper price class with clear cost advantages with respect to its manufacturing, the backrest side members are constructed to be open toward the outside and have a surrounding edge profile on which fastening elements for the common fastening of the backrest-frame-side fitting parts of the seat fittings and of modules are arranged which carry operating parts, such as backrest adjusting devices, an armrest, a seat belt, a side bag, etc. In this case, the backrest-side fitting parts and the modules are accommodated in a form-locking manner in the edge profile.

23 Claims, 4 Drawing Sheets

VEHICLE SEAT ASSEMBLEY WITH BACKREST FRAME SWIVELABLY COUPLED WITH A SEAT FRAME

BACKGROUND AND SUMMARY OF THE INVENTION

This invention relates to a vehicle seat having a seat frame and a backrest frame which, in particular, is made of a light metal diecast material and which has two backrest side members which extend in parallel to one another and are constructed as profiles open to the outside and which are connected by means of at least one upper and lower cross member, and having seat fittings which swivellably connect the backrest frame and the seat frame with one another and which each have a backrest-side fitting part and a seat-side fitting part.

In the case of a known vehicle seat of this type (German Patent Document DE 40 20 057 A1), the backrest side members, which are open toward the side, are provided in the interior with approximately zigzagging reinforcing ribs and cast-on threaded sleeves into which connected bolts can be screwed which penetrate the backrest-side fitting part as well as an inserted beaded relief plate and are used for fastening the backrest-side fitting parts to the backrest side members. In addition, a backrest supporting structure is known (German Patent Document DE 38 41 532 A1) which consists of a plastic injection-molded part and has backrest side members which are open to the side, the hollow space situated in the latter being provided with ribs used for the reinforcement and being coverable by means of an exterior covering.

In the case of another known vehicle seat (German Patent Document DE 42 38 549 A1), the backrest side members are constructed as open profiles which are cast in a thin-walled manner and which are connected along their length in one piece with one support york respectively. The backrest-side fitting parts of the seat fittings are rivetted laterally from the outside to the backrest side members, while the seat-side fitting parts have bores for the leading-through of fastening screws.

Normally, operating parts are attached to such vehicle seats, such as a motor-operated backrest adjuster for the swivelling of the backrest frame with respect to the seat frame or a seat belt system. Special fastening constructions must then be provided on the backrest frame for this purpose.

It is an object of the invention to provide a vehicle seat of the initially mentioned type which, in the manner of a building block system, can be upgraded by means of standardized supplemental parts from a simple seat for the lower priced vehicle models to an integral seat for the highest priced vehicle models, with a clear advantage with respect to manufacturing costs.

This object is achieved according to the invention by providing a vehicle seat of the above-noted type, wherein each backrest side member has a surrounding edge profile which projects in one piece from a profile surface to the outside and on which, at least in a lower area close to the seat frame, fastening elements are arranged for the common fastening of a backrest-side fitting part of the seat fittings and of a reinforcement or of a module which carries at least one operating part, such as a backrest adjusting drive, a seat belt system, a side bag, or an armrest, and wherein the backrest-side fitting part of the seat fittings and the reinforcement or the module are accommodated in the edge profile in a form-locking manner at least in the fastening area.

The vehicle seat according to the invention has the advantage that it can be upgraded by means of a standardized, stable basic backrest from a basic seat model of the simplest construction to a comfort model with a belt retractor, a side bag, a side impact protection, an armrest, a motor-operated backrest adjusting device or other operating parts integrated according to the customer's wishes. By means of the given modules, the vehicle seat can therefore be adapted to a plurality of very different demands, without the requirement of always having to manufacture new tools for the complete seat. The most expensive part of the vehicle seat, specifically the largely crash-resistant backrest frame as well as the seat frame with the displacing mechanism, are the same for all seats so that the manufacturing costs can be lowered as the result of the number of manufactured pieces (piece number effect).

Advantageous embodiments of the vehicle seat according to the invention with expedient further developments and embodiments of the invention are described herein and in the claims.

According to a first embodiment of the invention, in the simplest case of a vehicle seat design, only one motor-operated backrest adjusting mechanism is provided as an operating part which is mounted on the backrest-side fitting part of the seat fitting which acts as the support.

In a preferred embodiment of the invention, the module is constructed such that, after the fastening to the backrest side member, it forms a closed member profile together with it. As a result, the open profile of the backrest side members is converted by means of the module, which may be made of a cast material, sheet metal or a plastic material, to a closed profile with a clearly higher stability so that the module can also be used for the adaption of the backrest frame to almost any cases of stress.

According to a further embodiment of the invention, the module, which is placed on the exterior backrest side member (facing the vehicle side wall when the vehicle seat is installed into the vehicle), is also equipped with a seatbelt. The belt retractor and the upper deflection fitting of the safety belt system are integrated in the module and the lower end fitting of the safety belt is arranged on the seat-side fitting part of the seat fitting.

In further developments of the invention, a side bag can also be integrated in this module support. Also a laterally projecting support for a headrest can be fastened or molded to this module support.

Other objects, advantages and novel features of the present invention will become apparent from the following detailed description of the invention when considered in conjunction with the accompanying drawings.

DETAILED DESCRIPTION OF THE DRAWINGS

Figure 1:
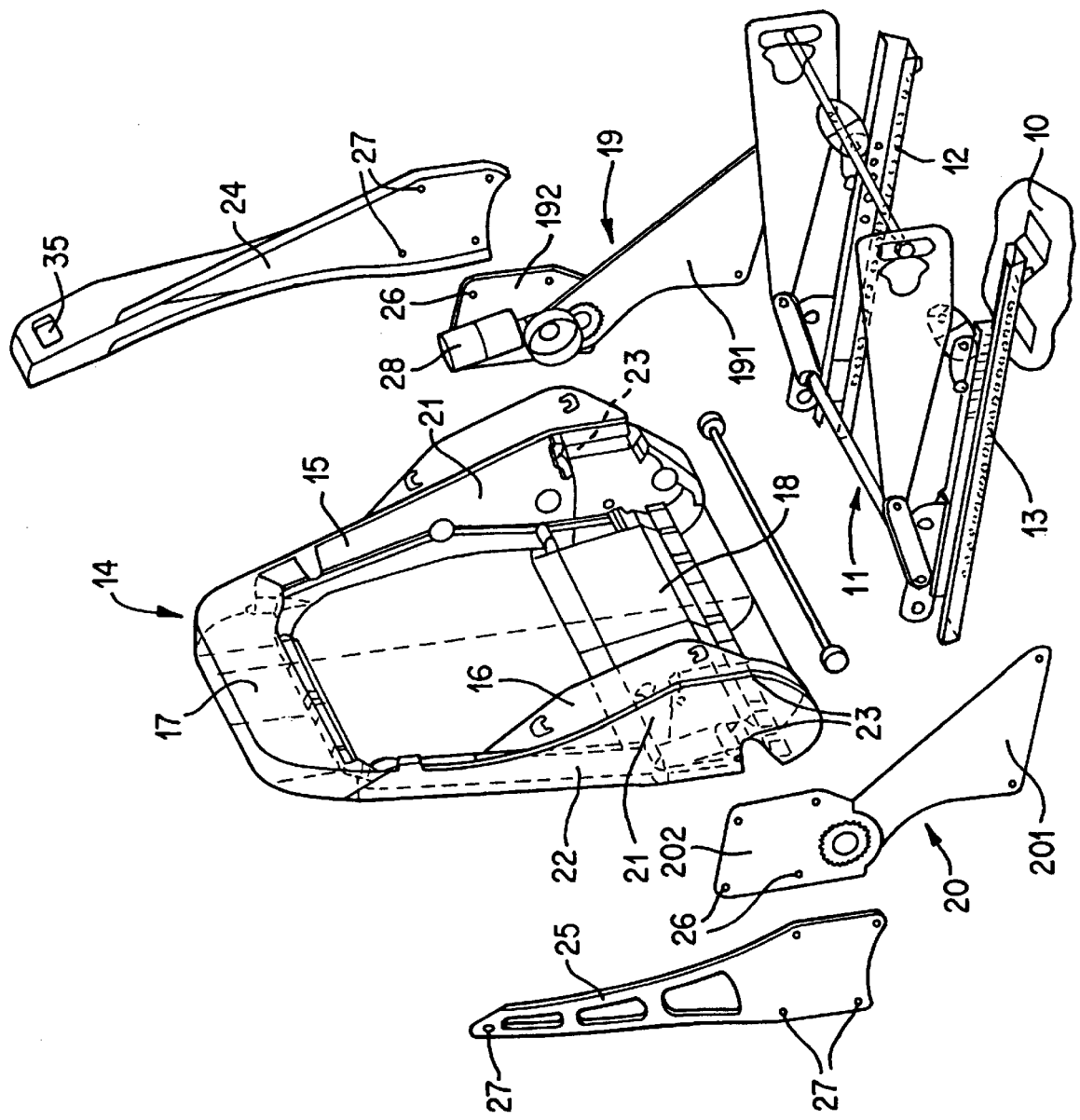
FIG. 1 is an exploded view of a vehicle seat for a passenger car, constructed according to a preferred embodiment of the present invention.

The vehicle seat for a passenger car which is illustrated in an exploded view in FIG. 1 comprises a seat frame 11 held in a longitudinally slidable manner in guide rails 12, 13 fastened to the vehicle floor 10. The seat also comprises a backrest frame 14 made of a light metal diecast material which has two backrest side members 15, 16 which extend in parallel to one another as well as an upper and a lower cross member 17, 18 which connect the backrest side members 15, 16 with one another. By way of two seat fittings 19, 20, the backrest frame 14 is connected to the seat frame 11. Each seat fitting consists of two fitting parts 191, 192 and 201, 202 which are connected with one another in an articulated manner, the seat-side fitting part 191 and 201 being fastened to the seat frame 11 and the backrest-side fitting part 192 and 202 being fitted to the backrest frame 14.

The two backrest side members 15, 16, which have an identical but mutually mirror-symmetrical construction, are designed to be open to the outside and have a surrounding edge profile 22 which projects from a profile surface 21 to the outside. In the lower area, close to the seat frame, several fastening elements 23 for the backrest-side fitting parts 192, 202 of the seat fittings 19, 20 and for modules 24 accommodating various operating parts or for reinforcements 25 are provided on the edge profile 22. For this purpose, internal threads are cut into the fastening elements 23 or bores for thread-forming screws are entered into the fastening elements 23 into which the fastening screws can be screwed which are fitted through corresponding bores 26, 27 in the backrest-side fitting parts 192, 202 and in the modules 24 or reinforcements 25. The backrest-side fitting parts 192, 202 and the modules 24 or reinforcements 25 are accommodated in the fastening area of the fastening elements 23 in a formlocking manner in the edge profile 22.

For adjusting the inclination of the backrest frame 14 with respect to the seat frame 11, a motor-operated backrest adjusting drive 28 is provided which consists of an electric motor and an adjusting gear. As the support for the "backrest adjusting drive" operating part 28, the backrest-side fitting part 192 of the seat fitting 19 is used. In this case, the backrest adjusting drive 28 is fastened on the interior side of the backrest-side fitting part 192 so that, after the mounting of the seat fitting 19, it is spatially placed between the profile surface 21 of the backrest side member 15 and the backrest-side fitting part 192.

The reinforcement 25, which together with the backrest-side fitting part 202, is fastened to the fastening elements 23 on the edge profile 22 of the right backrest side member 16, is constructed such that, after the fastening on the backrest side member 16, it forms a box support together with it. This box support clearly has a higher stability than the backrest side member 16 alone. According to the construction of the reinforcement 25, the backrest side member 16 can therefore be adapted to different load cases.

Figure 3:
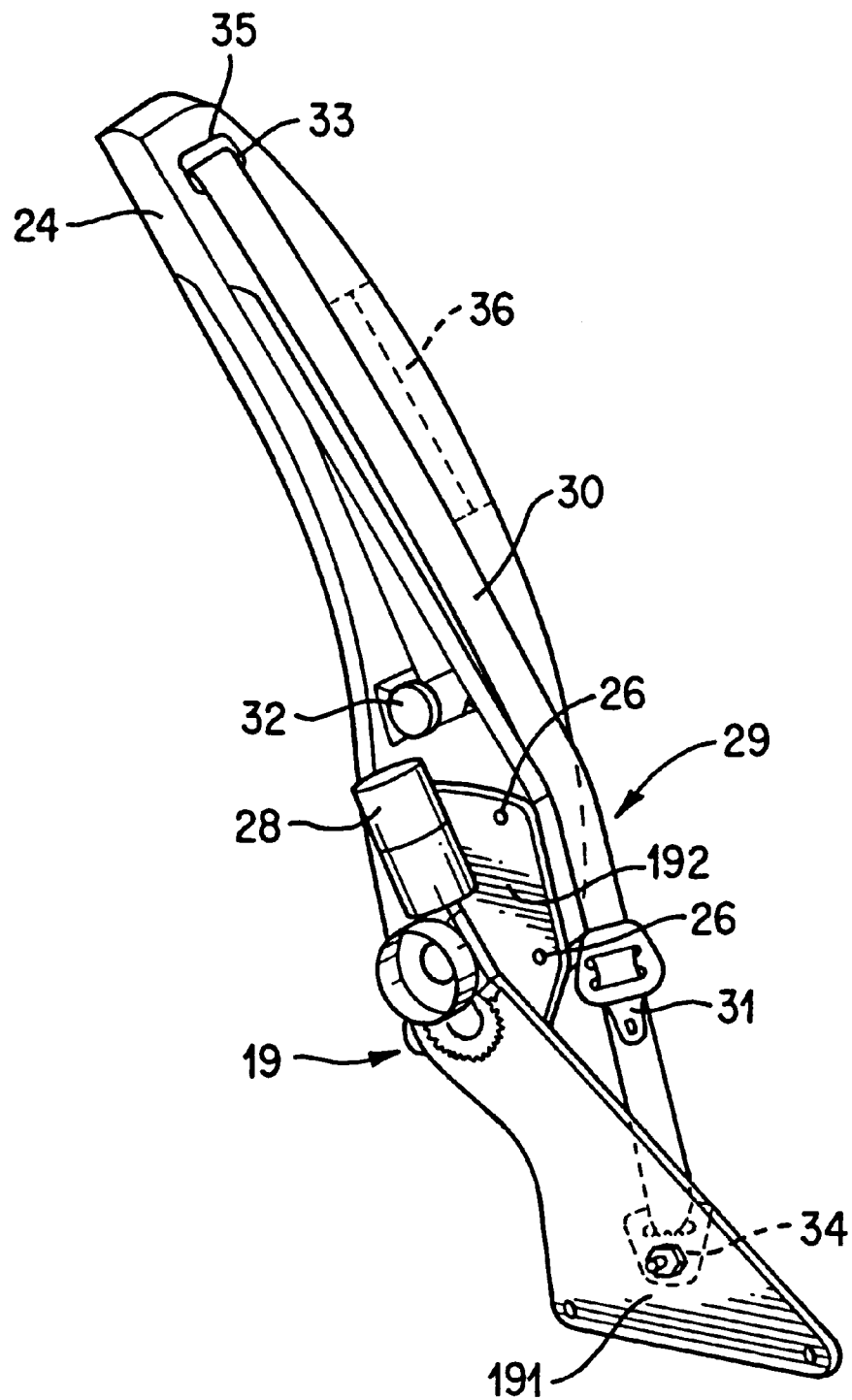
FIG. 3 is perspective representation of a module on the vehicle seat according to FIG. 1.

The module 24 for the fastening to the left backrest side member 15 is—like the above-described reinforcement 25—first used for converting the open member profile of the left backrest side member 15 into a largely closed profile of high stability. In addition, the module 24 is shaped such that a seat belt system 29 can be integrated in it as an operating part. As shown in FIG. 3, module 24 includes the integrated seat belt system 29 consisting of the seat belt 30 with the buckle latch 31, which can be slid on it, for the insertion into the belt buckle fixed on the vehicle side; the belt retractor 32, the deflection fitting 33 and the end fitting 34. The belt retractor 32 is fastened in the interior of the module 24 so that, after the module 24 has been connected with the backrest side member 15, it is covered by the profile surface 21 of the backrest side member 15. The deflection fitting 33 is arranged in the upper part of the module 24 which extends to the upper edge of the backrest frame 14 and has a passage opening 35 here for the seat belt 30. The seat belt 30, which is wound off the belt retractor 32, is guided by way of the deflection fitting 33 and through the opening 35, travels on the outside along the front side of the module 24 to the end deflection 34 which is fastened to the seatside fitting part 191 of the seat fitting 19.

In the illustration of FIG. 3, the seat fitting 19 is a premounted component of the module 24 so that the "backrest adjusting drive" operating part 28 is also already integrated in the module 24. The module 24 is placed on the fastening elements 23 on the edge profile 22 of the left backrest side member 15 and, by means of cap screws, which are guided through the bores in the module 24 and in the backrest-side fitting part 192, is screwed together in the fastening elements 23. FIG. 3 shows only the bores 26 in the backrest-side fitting part 192.

As indicated by a dash-dotted line in FIG. 3, the module 24 can also accommodate another operating part, specifically a so-called side bag 36 for protecting the seat user in the case of a side impact. In the case of a crash, the side bag 36 is abruptly inflated in a known manner and emerges from the module 24 in order to shield the seat user's head from an impact on the side window of the vehicle.

Figure 4:
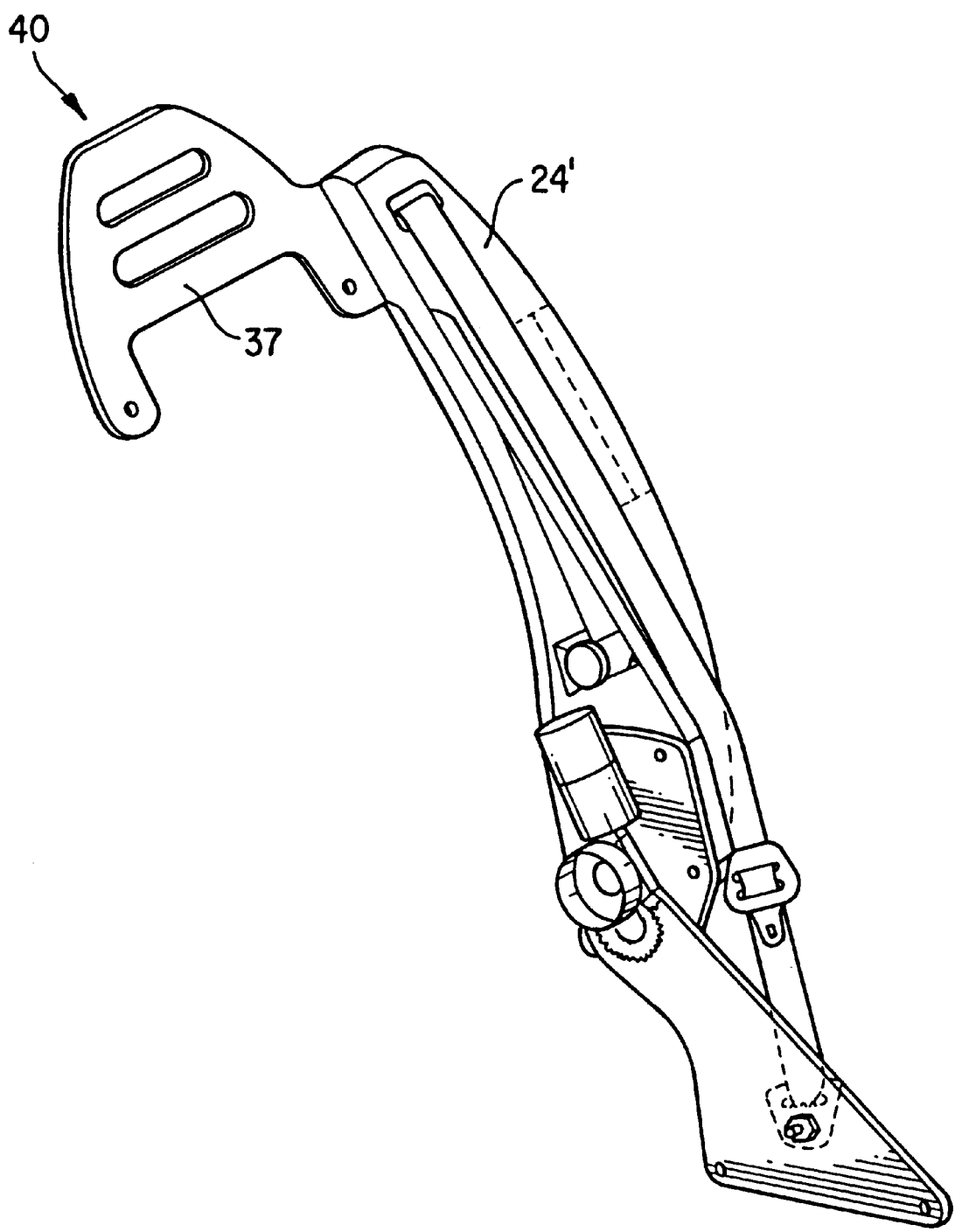
FIG. 4 is the same representation as in FIG. 3 with a modified embodiment.

The module 24' illustrated in FIG. 4 which, instead of the module 24 from FIG. 3, can be fastened to the left backrest side member 10, differs from the above-described module 24 in that a laterally projecting holder 37 for a headrest 40 is also fastened or molded to the upper end of the module 24'. In this case, the headrest 40 can be constructed to be fixed or vertically adjustable.

Figure 2:
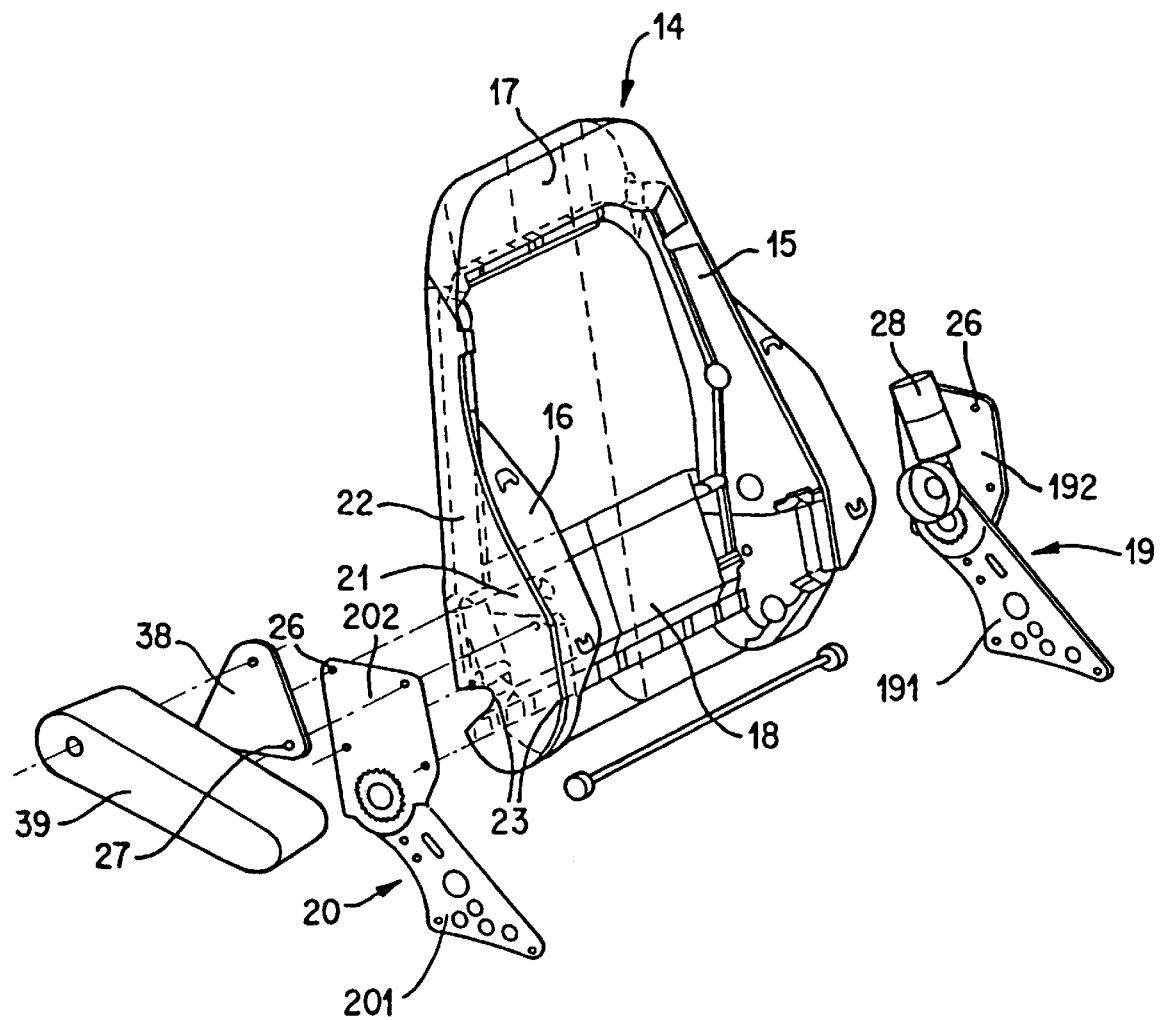
FIG. 2 is an exploded view of the backrest frame of the vehicle seat in FIG. 1 with a modified module.

In the case of the backrest frame 14 illustrated in FIG. 2, the module 24 and the reinforcement 25, as illustrated in FIG. 1, are eliminated. The backrest frame 14, which is also made of a light metal diecast material, therefore has a lower stability. The backrest frame 14 is again equipped with the "motor-operated backrest adjusting drive" 28 which, in the above-described manner, is held on the backrest-side fitting part 192 of the seat fitting 19 and is placed with it in the edge profile 22 on the left backrest side member 15. Another module 38 is placed on the right vehicle member 16 and swivellably accommodates the armrest 39 as another operating part. The module 38, which is constructed here as a rounded triangular supporting plate, is screwed in the above-described manner, together with the backrest-side fitting part 202 of the seat fitting 20 by means of two cap screws fitted through the bores 27 in the module 38 and bores 26 in the backrest-side fitting part 202, to the two upper fastening elements 23, as indicated by the dash-dotted lines in FIG. 2. The required seat belt system 29, as it is integrated into the vehicle seat according to FIGS. 1 and 3, must also be attached on the vehicle side in the case of the vehicle seat according to FIG. 2.

The armrest 39 can also optionally be attached in the case of the integral seat according to FIG. 1. The plate-shaped module 38 will then be constructed such that it also takes over the function of the reinforcement 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle seat assembly comprising:

a seat frame;

a backrest frame made of a light metal diecast material and having two backrest side members extending parallel to one another, wherein each of the side members has an outer side profile positioned to face away from the other side member and an inner side positioned to face towards the other side member;

at least one upper cross member and one lower cross member connecting said backrest side members; and seat fittings swivellably connecting the backrest frame and the seat frame to one another, each of said seat fittings having a backrest-side fitting part and a seat-side fitting part;

wherein each of the backrest side members has a channel shaped cross sectional profile formed by a surrounding edge profile portion which is integrated into and projects from the outer side profile of said backrest side member, fastening elements are arranged for commonly fastening a backrest-side fitting part of the seat fittings together with one of a reinforcement member and a module, which carries at least one operating part for a vehicle seat; and wherein the backrest-side fitting part of the seat fittings and one of the reinforcement member and the module are accommodated on said edge profile portion.

2. The vehicle seat according to claim 1, wherein the backrest-side fitting part of said seat fitting forms a support for a module having a motor-operated backrest adjusting drive.

3. The vehicle seat according to claim 2, wherein the seat fitting is a preassembled component of the module.

4. The vehicle seat according to claim 3, wherein the module forms a closed member profile together with the backrest side member, after fastening onto the backrest side member.

5. The vehicle seat according to claim 4, wherein:

the module accommodates a belt retractor and a deflection fitting for a seat belt of a seat belt system; and an end fitting for the seat belt is arranged on the seat-side fitting part of the seat fitting.

6. The vehicle seat according to claim 5, wherein a side bag is integrated in the module.

7. The vehicle seat according to claim 6, wherein a laterally projecting holder of a headrest is fixed to the module by a process selected from the group consisting of fastening and molding.

8. The vehicle seat according to claim 5, wherein a laterally projecting holder of a headrest is fixed to the module by a process selected from the group consisting of fastening and molding.

9. The vehicle seat according to claim 1, wherein the module forms a closed member profile together with the backrest side member, after fastening onto the backrest side member.

10. The vehicle seat according to claim 9, wherein:

the module accommodates a belt retractor and a deflection fitting for a seat belt of a seat belt system; and an end fitting for the seat belt is arranged on a seat-side fitting part of the seat fitting.

11. The vehicle seat according to claim 10, wherein a side bag is integrated in the module.

12. The vehicle seat according to claim 9, wherein a side bag is integrated in the module.

13. The vehicle seat according to claim 12, wherein a laterally projecting holder of a headrest is fixed to the module by a process selected from the group consisting of fastening and molding.

14. The vehicle seat according to claim 9, wherein a laterally projecting holder of a headrest is fixed to the module by a process selected from the group consisting of fastening and molding.

15. The vehicle seat according to claim 2, wherein the module forms a closed member profile together with the backrest side member, after fastening onto the backrest side member.

16. The vehicle seat according to claim 1, wherein said at least one operating part for a vehicle seat is selected from the group consisting of a backrest adjusting drive, a seat belt system, a side bag, and an armrest.

17. A vehicle seat assembly comprising:

a seat frame;

a backrest frame having at least a first backrest side member at a first lateral side thereof, said backrest side member having a channel shaped cross section formed by an edge profile projecting outwardly from a first profile surface of said backrest side member;

a first seat fitting having a first seat frame side fitting part and a first backrest frame side fitting part, and being adapted to connect the backrest frame and the seat frame together;

and at least one first fastening element arranged in a lower area of the first backrest side member, said first fastening element being configured for common fastening the first backrest frame side fitting part and at least one of a reinforcing part and an operating part module;

wherein said first backrest frame side fitting part of the first seat fitting and said at least one of the reinforcement part and an operating module are configured to be accommodated at the edge profile.

18. The vehicle seat assembly according to claim 17, wherein said first seat fitting is configured to pivotably connect the seat frame to backrest frame.

19. The vehicle seat assembly according to claim 17, further comprising:

a second backrest side member at a second opposite lateral side of said backrest frame, said second backrest side member having an edge profile projecting outwardly from a second profile surface;

a second seat fitting having a second seat frame side fitting part and a second backrest frame side fitting part and being adapted to connect the backrest frame and the seat frame together; and at least one second fastening element arranged in a lower area of the second backrest side member, said second fastening element being configured for fastening the second backrest frame side fitting part to at least one of a reinforcing part and an operating part module;

wherein said second backrest frame side fitting part of the second seat fitting and said at least one of the reinforcement part and an operating module are configured to be accommodated at the edge profile.

20. The vehicle seat assembly according to claim 19, wherein said first and second seat fittings are configured to pivotably connect the seat frame to backrest frame.

21. The vehicle seat assembly according to claim 17, wherein an operating module is accommodated at the edge profile, said operating module including a backrest adjusting drive unit.

22. The vehicle seat assembly according to claim 17, wherein:

an operating module is accommodated at the edge profile, said operating module including a seat belt retractor and deflecting fitting for seatbelt of the seat belt system; and an end fitting for the seatbelt is arranged on the first seat side fitting part of the seat fitting.

23. The vehicle seat assembly according to claim 17, wherein an operating module is accommodated at the edge profile, said operating module including a side airbag.

* * * * *